(No Model.) 2 Sheets—Sheet 2.
C. TIMM.
SPROCKET WHEEL.
No. 519,781. Patented May 15, 1894.
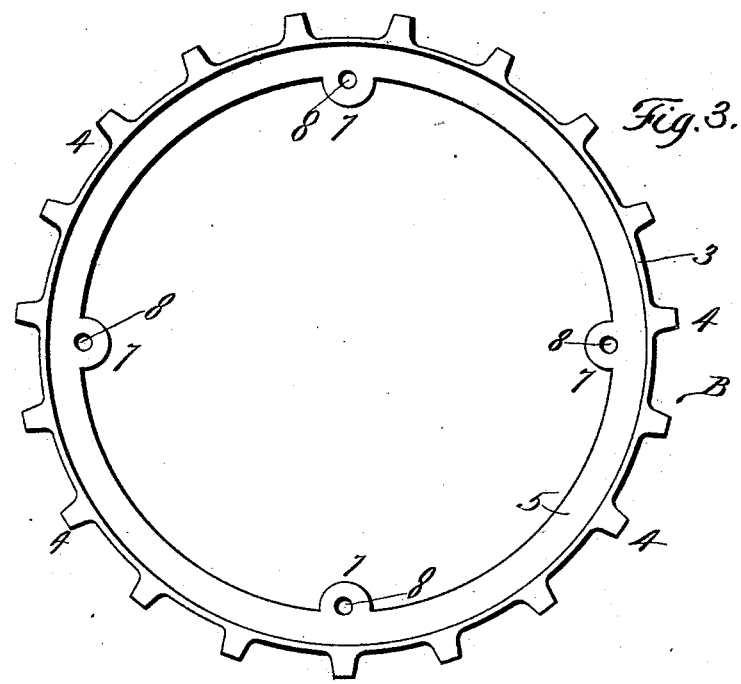
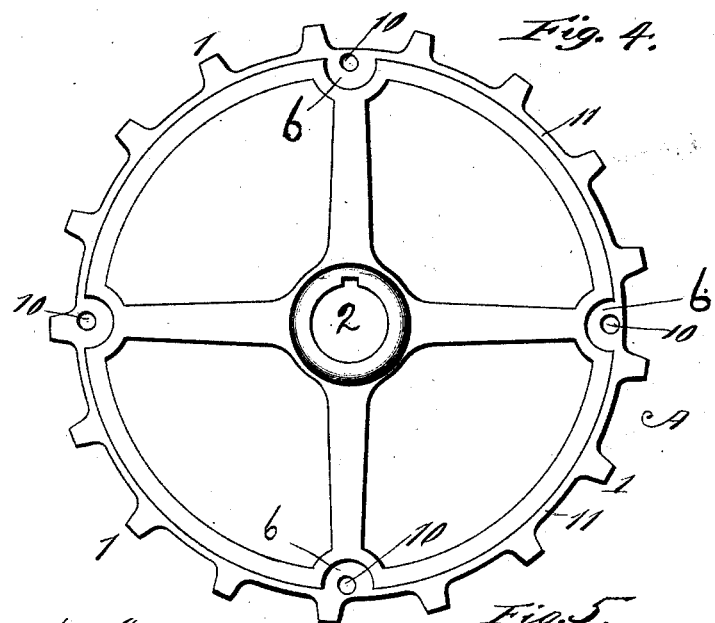
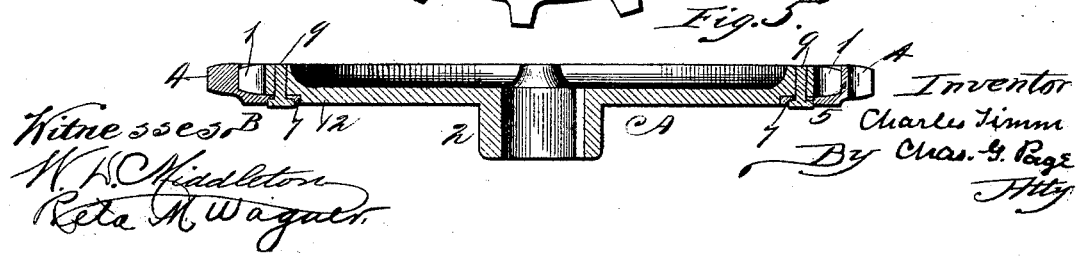

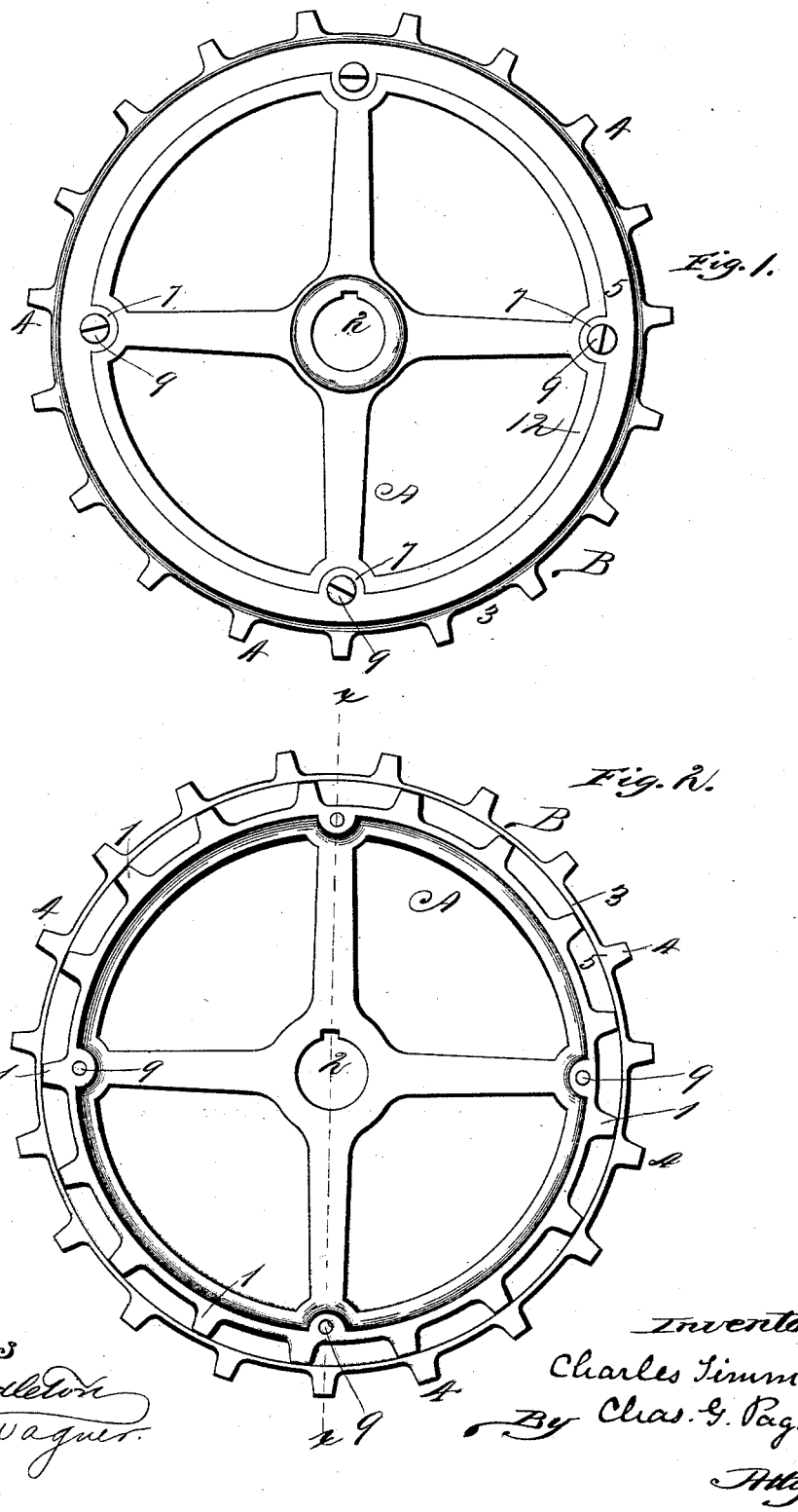

UNITED STATES PATENT OFFICE.

CHARLES TIMM, OF MORGAN PARK, ASSIGNOR TO THE UNION MANUFACTURING AND PLATING COMPANY, OF CHICAGO, ILLINOIS.

SPROCKET-WHEEL.

SPECIFICATION forming part of Letters Patent No. 519,781, dated May 15, 1894.

Application filed December 27, 1892. Serial No. 456,467. (No model.)

*To all whom it may concern:*

Be it known that I, CHARLES TIMM, a citizen of the United States, residing at Morgan Park, in the county of Cook and State of Illinois, have invented a certain new and useful Improvement in Sprocket-Wheels for Velocipedes, of which the following is a specification.

In Letters Patent of the United States No. 299,883, of June 3, 1884, it is proposed to detachably secure a sprocket wheel to a flanged hub, and to change the size of gear by removing the toothed wheel from the hub and substituting therefor a toothed wheel of different size.

My invention to the contrary, contemplates a completed structure involving in its organization a capability of providing differently sized gear-wheels, and of permitting the change of gear to be made in a simple, convenient and effective way.

In carrying out my invention I provide a suitable gear wheel with a supplemental flanged rim gear which is detachably secured to the main wheel, and adapted so that when thus secured in place it shall provide a large gear for high speed. By removing said rim however, the main wheel can be used as a smaller gear for moderate riding. By such arrangement, I provide a double gear consisting of the inner main gear wheel and an outer supplemental rim gear which said two members can be conveniently and effectively fitted and secured together and as an entirety fitted upon the crank axle of a bicycle or other velocipede. The rider can therefore use the device as a large gear, and can at any time reduce the size of gear by simply removing the rim gear so as to expose the main or inner gear wheel. When it is desired to again increase the size of gear, the rim gear can be put back upon the main gear wheel. As a means for readily and effectively connecting said members together I provide the main gear wheel with a set of seats or recesses, and provide the rim gear with a corresponding set of lips or lugs which when fitted within said seats or recesses will insure reliable driving connection between the main wheel and rim. The parts thus connected can be secured against accidental separation by screws which are relieved from driving strain and which can be readily removed when it is desired to take off the rim gear.

In the accompanying drawings,—Figure 1 represents in elevation a double sprocket embodying my invention. Fig. 2 is a like view showing the opposite side of the same. Fig. 3 represents the rim detached from the wheel. Fig. 4 represents the wheel without the rim. Fig. 5 is a section through Fig. 2 on line $x$—$x$.

The main gear wheel A is provided with sprocket teeth 1, adapted for a chain or link belt such as is commonly used in velocipedes. The wheel A is also formed with the usual hub or center portion 2 which is adapted for securement upon the crank axle. The rim gear B is also provided with sprocket teeth, and is formed so that it can be detachably secured to the main wheel and thereby practically provide an enlarged gear or sprocket. As a simple and preferred construction, the rim gear consists of an annular band or hoop 3 which is provided with teeth 4 and adapted to encircle the main wheel A. By such arrangement the teeth of the rim can lie in the plane occupied by the teeth of the main wheel, so that when the rim is removed the chain can be applied to the wheel A without shifting the latter along the axle. The rim is also provided with an annular flange 5, formed along one edge of its annular portion 3 and adapted to fit against the main wheel, and in order to provide effective driving connection between the wheel and rim and also to permit the rim to be rigidly held upon the main wheel by only a few light screws, or like temporary fastenings, the wheel is provided with seats, off-sets or recesses 6 (Fig. 4) in which lips or lugs 7 on the rim are received when said two members are fitted together. These lugs can be provided with holes 8 for screws 9 which can be inserted through the same and screwed into threaded openings 10 in the wheel. The rim gear can be readily and economically made with these lips or lugs, and in like manner the main wheel can be readily made with seats or recesses within which the lugs on the rim can be fitted. By such arrangement, a simple and reliable driving connection between the main gear wheel and the supplemental rim gear is provided, and since the screws employed for temporarily locking the parts together are relieved of strain, there will be no wear on the part of the screws and their bearings, and hence no working loose on the part of the connections between the rim and main wheel.

The marginal portion of the wheel A can at one side be reduced in thickness so as to form the seats or recesses 6, and also to provide an annular seat or offset 11, for the inner edge portion of the flange 5, in which way, the outer side of said flange can lie flush with the side 12 of the wheel as indicated in Fig. 5.

When the rim is secured upon the wheel as in Figs. 1 and 2 the driving chain can be arranged upon the rim. When however it is desired to reduce the size of the gear the rider can remove the rim from the wheel and apply the driving chain to the latter. It will also be observed that by reason of the way in which the rim is braced and held upon the wheel the said rim can be made comparatively light.

The main gear wheel and its supplemental rim gear are desirably toothed and adapted so that they can be alternately used for one and the same sprocket chain. The gear wheel and rim gear may however be adapted as gearing for other kinds of driving chains or belts, for example for driving bands or like power transmitting connection. The main wheel is preferably adapted for the crank axle, but I may also use the same on the wheel axle, when desired. The double gear formed as hereinbefore set forth could obviously be multiplied, by providing for a third removable rim gear, although the double arrangement shown is ordinarily sufficient.

What I claim as my invention is—

1. The toothed gear wheel provided with seats or recesses and the removable toothed rim having a flanged portion and provided with lips or lugs adapted to engage in said seats, substantially as described.

2. The toothed sprocket wheel provided with a removable toothed rim having a flanged portion 5 and removably fitted to the sprocket wheel, substantially as described.

3. The toothed sprocket wheel provided with an annular off-set 11 and the flanged rim adapted to fit upon the sprocket wheel and engage in said off-set, substantially as described.

4. The combination with a sprocket wheel of a toothed rim removably secured upon the side of the sprocket wheel and having its teeth arranged in a plane coincident with the plane of the teeth of the sprocket wheel, substantially as described.

CHARLES TIMM.

Witnesses:
 CHAS. G. PAGE,
 W. D. MIDDLETON.